R. BARTHELMES.
INSTRUMENT FOR MEASURING THE CROSS SECTION OF RAILS, &c.
APPLICATION FILED NOV. 16, 1908.

941,297.

Patented Nov. 23, 1909.

2 SHEETS—SHEET 1.

Witnesses:

Inventor
Richard Barthelmes
By
James L. Norris
Atty.

R. BARTHELMES.
INSTRUMENT FOR MEASURING THE CROSS SECTION OF RAILS, &c.
APPLICATION FILED NOV. 16, 1908.

941,297.

Patented Nov. 23, 1909.
2 SHEETS—SHEET 2.

Inventor
Richard Barthelmes
By
James L. Norris
Atty.

ially disposed against the side of the same. The

UNITED STATES PATENT OFFICE.

RICHARD BARTHELMES, OF ZELLA ST. BLASÜ, GERMANY.

INSTRUMENT FOR MEASURING THE CROSS-SECTION OF RAILS, &c.

941,297.   Specification of Letters Patent.   Patented Nov. 23, 1909.

Application filed November 16, 1908. Serial No. 462,880.

*To all whom it may concern:*

Be it known that I, RICHARD BARTHELMES, manufacturer, a subject of the Duke of Saxe-Coburg-Gotha, residing at Zella St. Blasii, Duchy of Saxe-Coburg-Gotha, Germany, have invented certain new and useful Improvements in or Relating to Instruments for Measuring the Cross-Section of Rails or the Like, of which the following is a specification.

My invention relates to an instrument for measuring the cross-section of railway rails.

It consists chiefly of a bracket surrounding the head of the rail, with clamping screws for securing the instrument to the rail head, and of a number of micrometric measuring screws mounted in said frame, a small number of which are arranged to extend when applied, perpendicular to the top of the rail head, and a large number radially disposed against the side of the same. The sleeves or sockets of the micrometer screws are provided with division lines for measuring the wear of the rail. To the bracket is pivoted an arm, which can be fixed by means of pins or the like, which carries a projection shaped to bear against the inner surface of the rail head and web.

A construction of the device for measuring the wear of railway rails is illustrated by way of example in the accompanying drawing in which—

Figure 1:
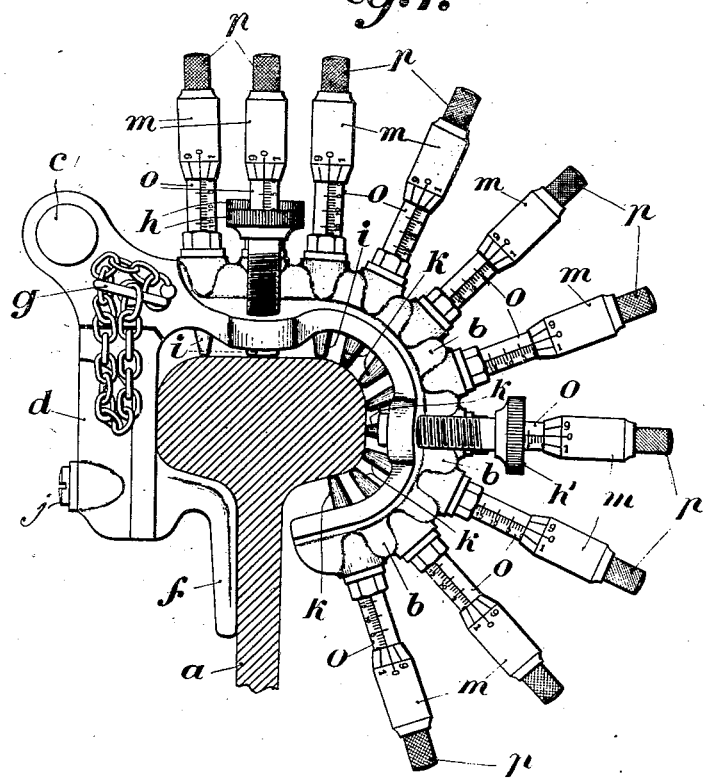
Figure 2:
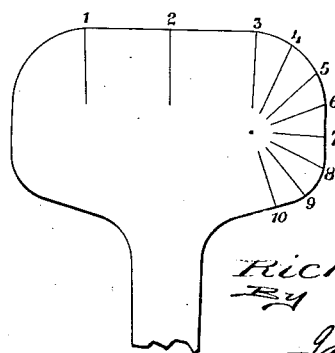
Figure 3:
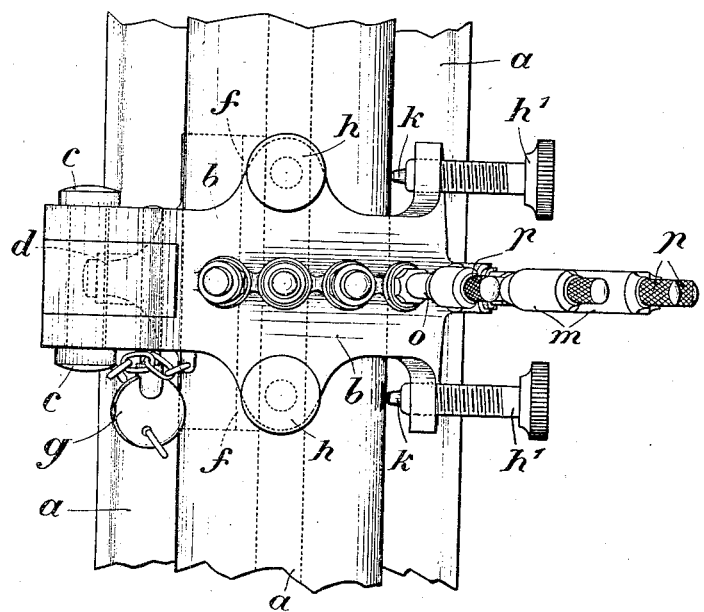
Figure 4:
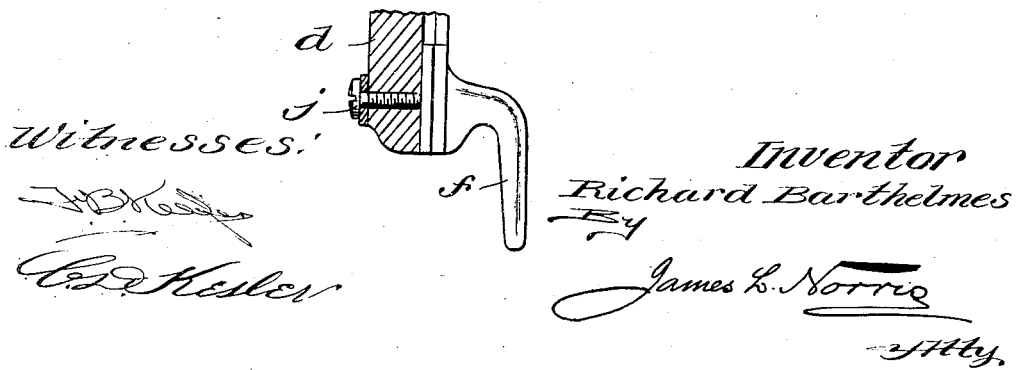

Figure 1 is a front elevation of the instrument showing it applied to a rail represented in cross section. Fig. 2 shows the templet of the cross-section of the rail, supplied with the instrument, by means of which the result of the measurement can be transferred to paper in the simplest manner. Fig. 3, is a top plan view of the instrument showing the fixing screws. Fig. 4 is a vertical sectional view of the lower end of the movable arm, showing the means for adjusting the arm at the lower end thereof to adapt the instrument to rail heads of varying heights.

*a* represents the rail to be measured, *b* the bracket surrounding the rail head, to which is pivoted at *c* an arm *d* resting against the side of the head and web of the rail and surrounding the rail head from below with its suitably bent projection *f*. This arm *d* with the projection *f* can be fixed in the bracket *b* by means of a pin *g*. The bracket *b* is provided with clamping screws *h* Fig. 3 acting vertically on the rail head. It is also provided with two clamping screws *h'* acting against the side of the rail head. By means of the above named devices, the rail measuring instrument can be secured to the rail head for the purpose of taking measurements.

*i* and *k* are micrometric screws by means of which is measured on any cross section the wear of the rail. The micrometric screws *i* arranged perpendicularly to the rail head, act against the upper surface of the rail *a*, while the radially arranged micrometric screws *k* act against the sides and the rounded off portion of the rail head, being so disposed that their axes intersect in one point. The micrometric screws *i* and *k* are provided with sleeves *m*, that rotate on graduated sleeves *o* and are provided at their outer ends with milled projecting pins *p* for the purpose of facilitating their adjustment.

If it is desired to take a measurement, the track ballast at the point to be measured is first of all removed, the outer side of the rail head is cleaned by means of a wire brush or the like from any dirt adhering thereto as far as the instrument reaches, and the apparatus is secured to the rail head in the following manner. The movable arm *d* is held in the left hand, and the micrometric screws *i* and *k* are screwed a few millimeters beyond the zero point, and the four fixing screws *h* and *h'* are screwed back to the point of rest. The pin *g* is thereupon withdrawn, the apparatus folded upward and, as shown in Fig. 1, placed over the rail head, and the pin *g* again put in. The movable arm *d* with its bottom projection *f* is pressed with the left hand firmly and uniformly against the rail head *a* and its stem, and first the lateral fixing screws *h'*, and then the upper fixing screws *h*, are slightly but uniformly tightened, so that only the said screws are resting on the rail head. After the instrument has been fixed in the manner described, the adjustment of the micrometric screws *i* and *k* is effected by tightening them until their points are in contact with the rail head. After completing the measurement, the pin *g* is again withdrawn, and the arm *d* folded upward with the left hand in a very careful manner so as not to disturb the screws *i* and *k* while with the right hand one of the fixing screws *h'* is held and the apparatus removed, with a movement to the right, from the rail *a*.

The templet shown in Fig. 2 is preferably made of paper of the exact size and shape of the rail to be measured before it has been used. On the face of the templet are a series of lines numbered from 1 to 10 inclusive each of which, if the templet were placed in the instrument, would be coincident with the axis of one of the micrometric screws $i$ and $k$, if said screws were set to the proper division on the sleeves $o$ required to measure a perfect rail. Let it be assumed that the correct division mark is zero (0) on all the sleeves $o$. If, now, the instrument be placed on a rail that has been in use for some time and the micrometric screws turned until they strike the rail, such screws as impinge on the worn parts of the same will have been advanced beyond the zero mark to a greater or lesser distance indicated by the graduations on the sleeves $o$ and the lower edges of the sleeves $m$. After the instrument has been removed from the rail, the reading of each micrometric screw is recorded on the corresponding line of the templet. From these readings a correct drawing on paper can be made showing the amount of wear of the rail caused by traffic.

The projection $f$ of the pivoted arm $d$ has for its object to fix the position of the apparatus exactly, in order that the measurements taken at different times should be also made in the same original position of the apparatus relatively to the cross-section of the rail, which is the only way of getting the exact result. Another fixing of the said position of the instrument, is obtained by the clamping screws $h$ and $h'$ which, owing to their distribution on the head of the rail, enable the same position to be always obtained.

A special advantage of the improved measuring instrument, is that it is secured merely to the rail head, unlike any other similar instrument of well known kind which must be secured under the rail, and in which the ballast for the rail must be first removed. For that reason, it is scarcely possible to adjust the old instruments quickly and correctly. The use of the new measuring instrument in the case of longitudinal sleepers has the further advantage that the measurement can be effected without taking off the rail.

The whole construction of the instrument makes it possible to make measurements very quickly and at any moment on free sections of the track or in the stations, without interfering with the movement of trains, as the measurement takes only a few minutes. It must be also pointed out that the number of micrometric screws $i$ and $k$ may also be reduced, if a smaller number of points are sufficient for determining the outline of the cross-section. By replacing the arm $d$ by another, the shape of which is made to suit that of the rail head, the instrument can also be used for measuring wider rails, and by loosening the screw $j$ and shifting the shoe $f$, also for measuring higher or lower rail heads, that is to say for measuring various cross-sections, and this replacing of the arm $d$ and shifting of the shoe $f$ will take up only a few minutes.

What I claim is:

1. An instrument for measuring the wear of rails comprising a bracket having a swinging arm, an adjustable shoe on said arm and fastening screws for securing said bracket firmly on the head of a rail, and a plurality of measuring devices, mounted on said bracket and arranged to be moved into contact with the head of the rail.

2. An instrument for measuring the wear of rails comprising a bracket having approximately the contour of a rail head and adapted to surround the same, clamping screws on said bracket for securing the instrument to the rail head only, a swinging arm pivoted on one end of said bracket and arranged to bear against one side of the rail head, an adjustable shoe on said arm capable of being moved against the under side of the rail head and a plurality of micrometric measuring screws mounted on said bracket in position to be moved independently into contact with the head of a rail.

3. An instrument for measuring the wear of rails comprising a bracket adapted to surround a rail head, clamping screws for securing the instrument thereto, a number of micrometric measuring screws mounted in said bracket, some of which are arranged perpendicular to the top of the rail head and others radially thereto, a sleeve for each screw provided with division lines, an arm pivoted on said bracket and adapted to be temporarily fixed thereto to bear against the side of a rail head, and a shoe on said arm fitted to the under side of said rail head and the web of the rail.

In testimony whereof I have hereunto set my hand in presence of two subscribing witnesses.

RICHARD BARTHELMES.

Witnesses:
GUSTA LANTZ, Jr.,
OSKAR HEIMANN.